May 27, 1947.  H. O. STEPHENS  2,421,300
TRANSFORMER CIRCUIT
Filed Dec. 4, 1944  2 Sheets-Sheet 1

Inventor:
Howard O. Stephens,
by Harry E. Dunham
His Attorney.

Inventor:
Howard O. Stephens,
by Harry E. Dunham
His Attorney.

Patented May 27, 1947

2,421,300

UNITED STATES PATENT OFFICE 2,421,300

TRANSFORMER CIRCUIT

Howard O. Stephens, Pittsfield, Mass., assignor to General Electric Company, a corporation of New York Application December 4, 1944, Serial No. 566,607

6 Claims. (Cl. 171—119)

This invention relates to transformer circuits and more particularly to improvements in voltage phase shifting transformer circuits for power systems.

A principal feature of the invention is characterized by a closed polyphase mesh-connected transformer winding, the effective voltages of whose phases are varied relative to each other, so as to shift the phase angle between junctions of the phases, combined with means for progressively transferring the line terminals of the winding from one symmetrical set of phase junctions to another, step by step all around the mesh so as to obtain in small steps a 360 electrical degree polyphase voltage phase shift. Another feature of the invention is a novel tap-changing circuit for varying the effective voltages of the phases of the polyphase mesh-connected winding.

An object of the invention is to provide a new and improved transformer circuit.

Another object of the invention is to provide a new and improved voltage phase shifting transformer circuit for alternating-current power systems.

A further object of the invention is to provide a new and improved circuit for changing taps within the mesh of a mesh-connected polyphase winding.

The invention will be better understood from the following description taken in connection with the accompanying drawing and its scope will be pointed out in the appended claims.

Figure 1:
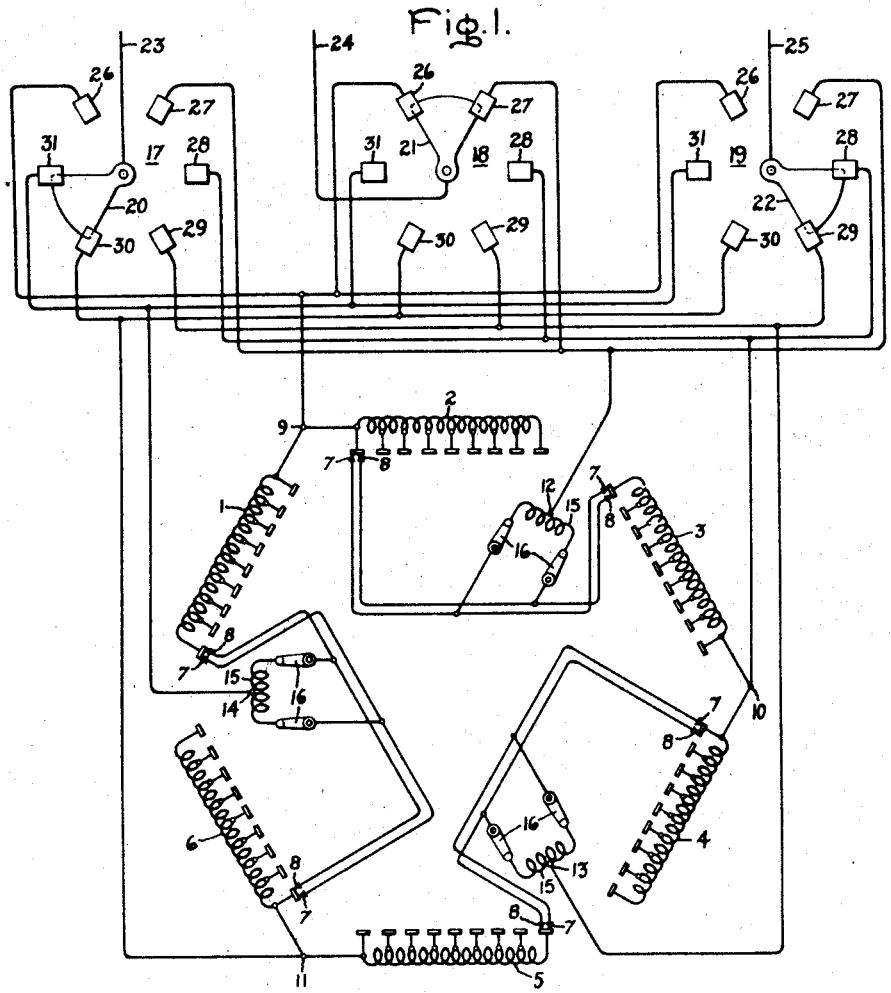
Figure 2:
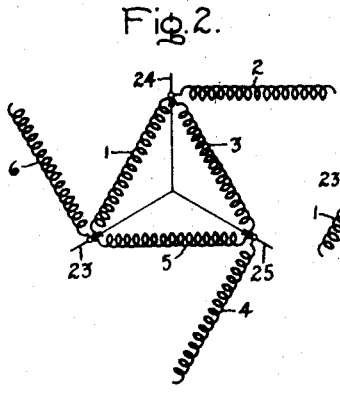
Figure 3:
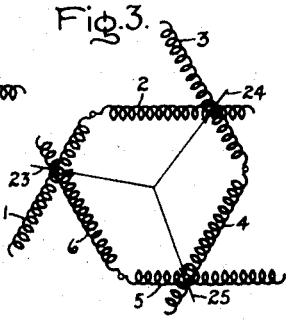
Figure 4:
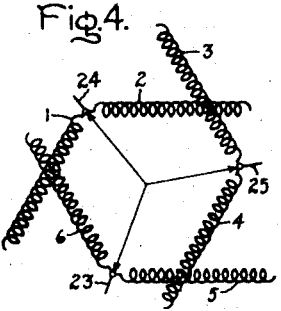
Figure 5:
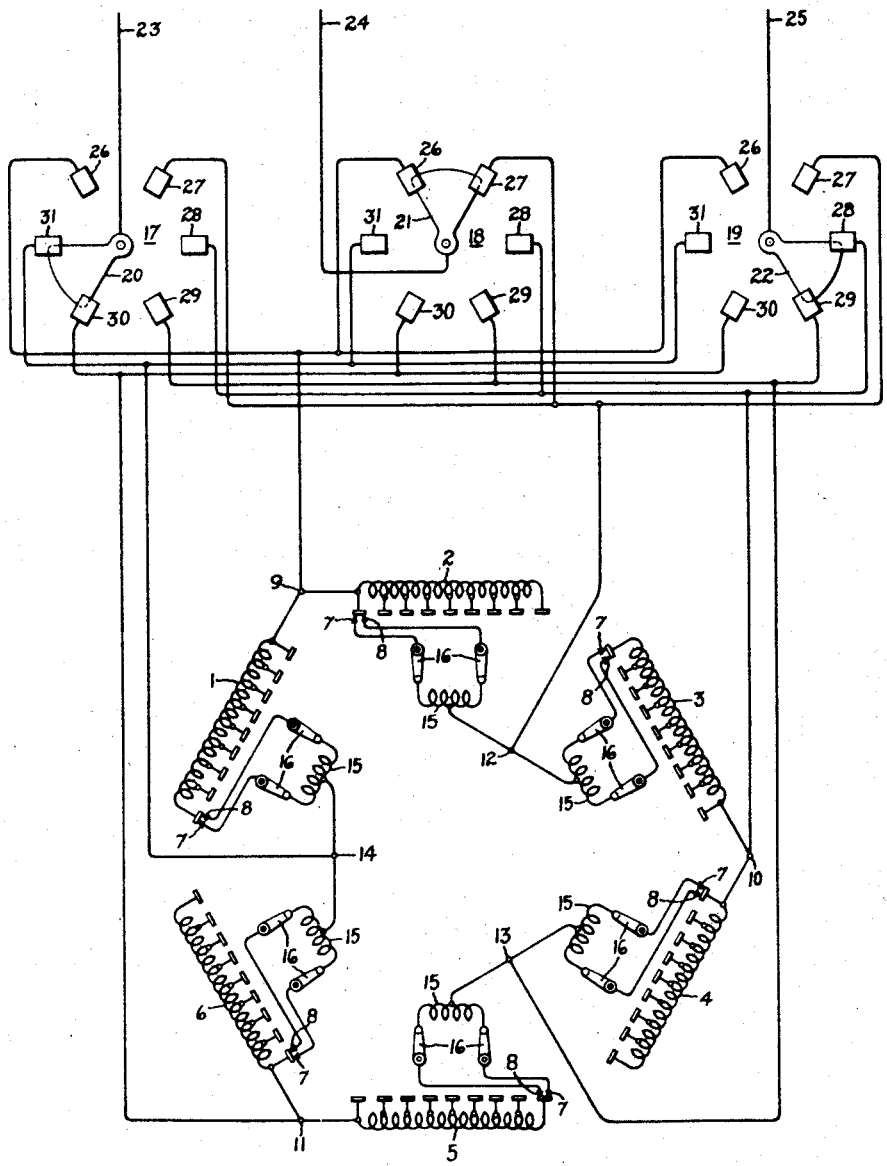

In the drawing Fig. 1 illustrates diagrammatically an embodiment of the invention, Figs. 2, 3 and 4 are diagrams for showing different operating conditions of Fig. 1, and Fig. 5 is a modification.

Referring now to the drawing and more particularly to Fig. 1, the invention is illustrated by way of example for a three-phase system. The mesh-connected winding is shown as being hexagonally connected and comprises six phase windings 1, 2, 3, 4, 5 and 6. Instead of showing these phase windings in their normal physical relation they are shown in what may be described as their vector voltage relation as this makes it easier to understand the invention. Thus, the axes of all the phase windings are parallel to their respective vector voltages so that windings 1 and 4 belong to one phase of the three-phase system as their voltages are in phase with each other, windings 2 and 5 belong to the second phase as their voltages are in phase with each other and are 120 electrical degrees displaced from the voltages of windings 1 and 4, and windings 3 and 6 belong to the remaining phase as their voltages are in phase with each other and are displaced 120 electrical degrees from the voltages of the other windings. Structurally the windings belonging to each phase will either be wound on the respective core legs of a three-legged core of a single three-phase transformer or, if desired, they may be wound on separate cores of single-phase transformers which are interconnected for polyphase operation. All of the phase windings are provided with taps which terminate in tap contacts and these tap contacts are selectively engaged by double-finger type ratio adjusters, the two fingers of which are shown at 7 and 8 in each case. One set of electrically symmetrically located junctions of the phase windings of the mesh preferably consists of permanent connections between these phase windings, these three junctions being 9, 10 and 11. The other set of junctions consists of the electrical mid-points 12, 13 and 14 of three similar impedances 15, the terminals of which are connected respectively to the ratio adjusters 7 and 8 which are associated with the phase windings whose junction is effected in this manner. These connections between the terminals of the impedances 15 and the ratio adjusters are preferably made and broken through arcing contacts 16.

The line terminal connections to the mesh winding are controlled by triplicate transfer switches 17, 18 and 19. These have "common" contacts 20, 21 and 22 connected respectively to the three line conductors 23, 24 and 25 of a three-phase circuit. These "common" contacts are shown co-operating with six additionl contacts 26, 27, 28, 29, 30 and 31 in each case. These triplicate switches are shown by way of example as dial type switches, although they may be straight line type switches or any other suitable type, but in any case the "common" contact of each switch is arranged to make a bridging connection between adjacent individual contacts when it moves from one to the other so that in this manner the line current is never interrupted. The individual contacts 26, 27, 28, 29, 30 and 31 are connected respectively to the junction points 9, 12, 10, 13, 11 and 14 of the mesh-connected winding.

The operation of Fig. 1 is as follows: Assume that the various phase windings are excited in any suitable manner so that their vector voltages have the phase relations indicated by the positions of the axes of these windings in the drawing. In this connection it should be recognized that the mesh winding may either be the primary winding or the secondary winding of either a conventional insulated winding transformer or an autotransformer. It will be noted that the ratio adjusters are in such positions that the effective voltage of phase windings 1, 3 and 5 is maximum and the effective voltage of phase windings 2, 4 and 6 is zero and that the transfer switches are in the positions for bridging the phase windings whose effective voltage is zero. Thus, common contact 20 of transfer switch 17 is in contact with both contacts 30 and 31 which are connected respectively to junctions 11 and 14 in the mesh, movable contact 21 of switch 18 is in contact with both contacts 26 and 27 which are connected respectively to junctions 9 and 12 in the mesh, and movable contact 22 of switch 19 is in engagement with both contacts 28 and 29 which are connected respectively to junctions 10 and 13 of the mesh. Under these conditions the phase relation of the voltage of the three phase circuit 23—24—25 with respect to the vector voltages of the phase windings of the mesh-connected winding is as shown in Fig. 2 in which the wye system of vectors corresponds to the voltage to neutral of the line conductors 23, 24 and 25.

If now it is desired to shift the phase of the polyphase line voltage clockwise, as viewed in the drawing, the transfer switches 17, 18 and 19 are turned clockwise, as viewed in the drawing, so that their "common" contacts disengage contacts 30, 26 and 28 respectively and are in engagement only with contacts 31, 27 and 29 respectively. This interrupts no current as the effective voltages of phase windings 2, 4 and 6 are zero at the time so that there is no voltage difference between contacts 30 and 31. The ratio adjusters 7 and 8 are then moved alternately step by step, the appropriate arcing contact 16 being opened first before each such movement, so as to increase the effective voltage of the phase windings 2, 4 and 6 and decrease the effective voltage of the phase windings 3, 5 and 1. The taps are preferably so chosen that this inverse change in the effective voltage of alternate phase windings around the mesh will, vectorially speaking, keep the six junctions of the phase windings of the mesh all on a circle, preferably all on a circle of constant diameter for in this manner voltage phase shift at constant voltage magnitude will be obtained.

The effect of this inverse change in the magnitude of the effective voltage of alternate phase windings is shown in Fig. 3 in which the effective voltage of the phase windings 2, 4 and 6 in the mesh has been increased and the effective voltage of the phase windings 1, 3 and 5 has been reduced resulting in a clockwise shift in phase of the polyphase line to neutral voltage of the three-phase circuit whose conductors are 23, 24 and 25. This tap-changing operation may be continued until the effective voltage of phase winding 1, 3 and 5 becomes zero and the effective voltage of phase windings 2, 4 and 6 is a maximum. This will result in a 60 electrical degree counterclockwise phase shift of the polyphase circuit voltage from the phase position shown in Fig. 2. At this point the transfer switches 17, 18 and 19 can be moved counterclockwise, first bridging between adjacent fixed contacts and then out of engagement with the first one and into sole engagement with the second one. This will not cause any arcing because the voltages of the bridged contacts are the same as they are connected across the junctions between which the effective voltage of the phase windings is zero. The ratio adjusters or load-ratio-control mechanisms may then be reversed so as to decrease the effective voltage of phase windings 2, 4 and 6 and increase the effective voltage of phase windings 1, 3 and 5, thus continuing the counterclockwise phase shift of the circuit voltage. In this manner it is possible to proceed all around the mesh so as to produce a 360 or more electrical degree clockwise phase shift.

If instead of a clockwise phase shift it is desired to have a counterclockwise phase shift, then the operation is in effect the reverse of that which has already been described. Thus, the transfer switches 17, 18 and 19 will have their movable contacts rotated counterclockwise so that starting from the position shown in Fig. 1 they will move out of engagement with contact 31—27—29 and into sole engagement with contact 30—26—28. If now the ratio adjusters are operated in the same manner as heretofore, namely, so as to increase the effective voltage of phase windings 2, 4 and 6 and decrease the effective voltage of phase windings 1, 3 and 5, the voltage to neutral of the junctions 9, 10 and 11 will shift counterclockwise from the position shown in Fig. 2. This is illustrated in Fig. 4 and by continuing until the effective voltage of phase windings 1, 3 and 5 is zero and the effective voltage of phase windings 2, 4 and 5 is a maximum the voltage will be shifted 60 electrical degrees counterclockwise, at which point the transfer switches can be moved another step counterclockwise and the tap-changing operation repeated in the reverse direction so as to continue the phase shift counterclockwise through any desired angle.

The ratio adjusters 7 and 8 and the arcing contacts 16 may be operated either manually or automatically and may be interlocked mechanically in any suitable manner and, similarly, these elements may be interlocked mechanically with the transfer switches so that a single driving member when operated in one direction will cause continuous voltage phase shift in one direction and when rotated in the opposite direction will cause continuous voltage phase shift in the opposite direction.

In the modification shown in Fig. 5 the junctions 12, 13 and 14 instead of being at the midpoint of a circulating current limiting impedance 15 are at the mid-point of two such impedances in each case. In other words, there is a separate impedance 15 for each pair of ratio adjusters 7 and 8 instead of a common one for the two pairs which are associated with each of these junctions. This permits individual control of the ratio adjusters for each phase winding so that it is possible to secure both voltage phase shift and voltage magnitude control. In other words, the ratio adjusters can be operated in such a way as to change the effective voltages of the phase windings in the same direction and in the same proportion so as in effect to increase the diameter of the circle on which the vector voltage junctions lie and in this manner obtain voltage magnitude control. They can, of course, also be operated in the manner described for Fig. 1 so as to obtain phase control at constant magnitude when desired.

The operation of Fig. 5 is otherwise the same as Fig. 1.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States, is:

1. In combination, a closed polyphase mesh-connected winding, means for changing the effective turns of the phase windings of said mesh in such a manner as to keep the junctions of their effective vector voltages on a circle so as to vary the phase of the voltages of the junctions of said windings relative to the phase of the voltages of said phase windings, and means for selectively connecting the line conductors of a polyphase circuit to a plurality of sets of such junctions which are electrically symmetrically located in said mesh.

2. In combination, a closed polyphase mesh-connected winding, means for changing the effective turns of the phase windings of said mesh in such a manner as to keep the junctions of their effective vector voltages on a circle of fixed diameter so as to vary at constant magnitude the phase of the voltages of the junctions of said windings relative to the phase of the voltages of said phase windings, and means for selectively connecting the line conductors of a polyphase circuit to any set of such junctions which is electrically symmetrically located in said mesh.

3. In combination, a closed polyphase mesh-connected winding, all of the phases of said winding being provided with taps, alternate junctions of said phases being completed through serially-connected tap-changing switches which co-operate respectively with taps of the phases on each side of said junctions, a single circulating current limiting impedance for each set of tap-changing switches which is associated with a phase junction, and two sets of arcing contacts connected respectively in series with the terminals of each of said circulating current limiting impedances.

4. In combination, a closed symmetrical polyphase mesh-connected winding, means for varying the effective voltages of all of the phases of said winding between limiting conditions of zero effective voltage for one electrically alternate set of voltages coupled with maximum effective voltage of the remaining set and maximum effective voltage of said one alternate set coupled with zero effective voltage of said remaining set, and means for progressively transferring the line terminals of said winding from one symmetrically located set of phase junctions in said mesh to the next without opening the line circuit through said terminals, said line terminals being transferred only when the voltages of the phases which are between the junctions between which the transfer is made are zero.

5. In combination, a closed symmetrical polyphase mesh-connected winding, means for varying the effective voltages of all of the phases of said winding between limiting conditions of zero effective voltage for one electrically alternate set of windings coupled with maximum effective voltage of the remaining set and maximum effective voltage of said one alternate set coupled with zero effective voltage of said remaining set, said voltages being varied in such a manner as to keep the vector voltage of the junctions of said phases on a circle, and means for progressively transferring the line terminals of said winding from one symmetrically located set of phase junctions in said mesh to the next completely around said mesh without opening the line circuit through said terminals, said line terminals being transferred only when the voltages of the phases which are between the junctions between which the transfer is made are zero.

6. In combination, a closed symmetrical polyphase mesh-connected winding, means for varying the effective voltages of all of the phases of said winding between limiting conditions of zero effective voltage for one electrically alternate set of voltages coupled with maximum effective voltage of the remaining set and maximum effective voltage of said one alternate set coupled with zero effective voltage of said remaining set, said voltages being varied in such a manner as to keep the vector voltage of the junctions of said phases on a circle of fixed diameter, and means for progressively transferring the line terminals of said winding from one symmetrically located set of phase junctions in said mesh to the next completely around said mesh in both directions without opening the line circuit through said terminals, said line terminals being transferred only when the voltages of the phases which are between the junctions between which the transfer is made are zero.

HOWARD O. STEPHENS.

REFERENCES CITED

The following references are of record in the file of this patent:

UNITED STATES PATENTS

| Number | Name | Date |
|---|---|---|
| 2,330,088 | St. Palley | Sept. 21, 1943 |
| 2,200,979 | Blume | May 14, 1940 |
| 2,146,914 | Rauhut | Feb. 14, 1939 |